United States Patent [19]

Lummis

[11] Patent Number: 4,520,589

[45] Date of Patent: Jun. 4, 1985

[54] LOCKING AND RELEASING MECHANISM

[75] Inventor: Michael G. Lummis, Portage, Mich.

[73] Assignee: Pacific Atlantic Products, Ltd., Kalamazoo, Mich.

[21] Appl. No.: 526,999

[22] Filed: Aug. 29, 1983

[51] Int. Cl.³ ............................................. A01K 91/00
[52] U.S. Cl. .................................... 43/43.12; 43/27.4
[58] Field of Search .............................. 43/27.4, 43.12

[56] References Cited

U.S. PATENT DOCUMENTS

| | | | |
|---|---|---|---|
| 3,816,954 | 6/1974 | Bissonette | 43/43.12 |
| 3,839,813 | 10/1974 | De Smidt | 43/43.12 |
| 3,874,110 | 4/1975 | Larson | 43/43.12 |
| 3,892,083 | 7/1975 | Peterson | 43/43.12 |
| 3,925,920 | 12/1975 | Walker | 43/43.12 |
| 4,069,611 | 1/1978 | Dusich | 43/43.12 |
| 4,221,068 | 9/1980 | Roemer | 43/43.12 |
| 4,417,414 | 11/1983 | Hood | 43/43.12 |
| 4,453,336 | 6/1984 | Lowden | 43/43.12 |

*Primary Examiner*—Gene P. Crosby
*Attorney, Agent, or Firm*—Dressler, Goldsmith, Shore, Sutker & Milnamow, Ltd.

[57] ABSTRACT

A locking and releasing mechanism for a fishing line release adapted for use with a downrigger cable is disclosed. This device includes a housing adapted to receive a downrigger cable and a locking shaft for selective engagement with the downrigger cable. The device provides selective attachment and release of a plurality of stacked locking and releasing mechanisms and their associated fishing line releases to and from the downrigger cable allowing the downrigger cable to be continuously reeled into a boat.

15 Claims, 5 Drawing Figures

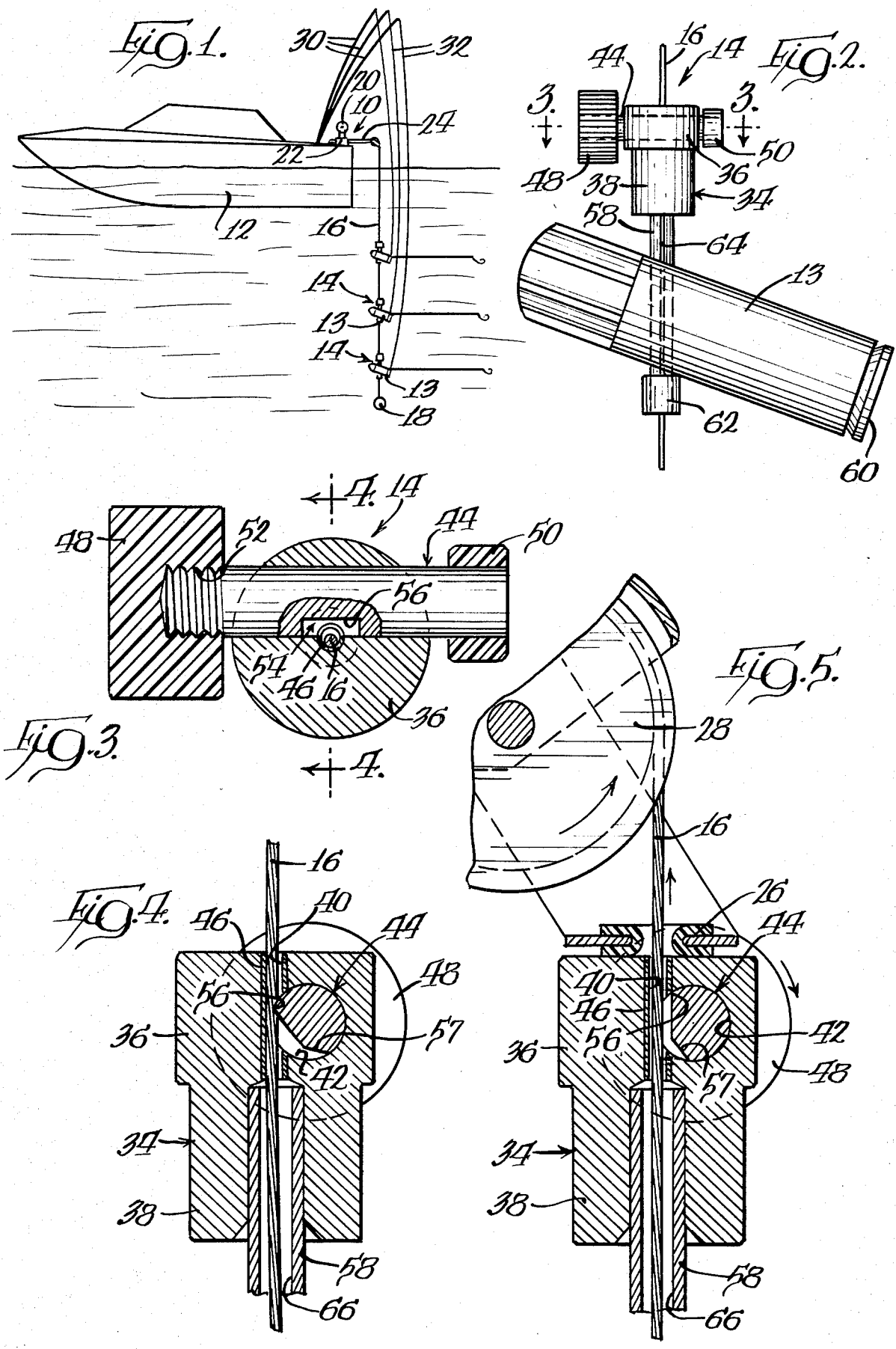

LOCKING AND RELEASING MECHANISM

TECHNICAL FIELD OF THE INVENTION

The present invention relates generally to a locking and releasing mechanism for use with downrigger fishing arrangements for trolling, and more particularly to a locking and releasing mechanism for a fishing line release having an improved arrangement for attachment to a downrigger cable.

BACKGROUND OF THE INVENTION

Downriggers are widely used for trolling during deep-water sport fishing. A downrigger system typically includes a frame which rotatably supports a reel which stores and dispenses downrigger cable. A downrigger arm extends from the frame and includes a guide arrangement at its free end for guiding the cable from the downrigger reel into and out of the water.

The downrigger is used by attaching fishing line from a fishing rod and reel to a fishing line release attached to the downrigger cable. The downrigger cable and fishing line release are lowered into the water so that the fishing line and its bait or lure are carried down to the desired depth by a weight carried by the downrigger cable. The boat upon which the downrigger system is mounted is then moved through the water at trolling speeds so that the fishing line and lure trail behind the boat in the desired manner. When a fish strikes the lure, the fishing line is released from the line release attached to the downrigger cable and the fisherman then exercises his skills with the fishing rod in order to play and eventually boat the catch.

Over the years, a variety of line releases have been developed. One such line release which provides the desired release action in a reliable and adjustable fashion is illustrated in commonly assigned U.S. Pat. No. 3,925,920 to Walker.

Frequently it is desirable to troll with a plurality of fishing lines in the water. However, it is not desirable to use a separate downrigger system for each line. Therefore, it would be beneficial to be able to stack a plurality of fishing line releases on one downrigger cable.

Stacking can be accomplished by use of the line release disclosed in the aforementioned U.S. Pat. No. 3,925,920, but inconvenience occurs when a downrigger cable having a plurality of stacked fishing line releases is reeled in. Since these fishing line releases are rigidly connected to the downrigger cable in a stacked configuration at predetermined locations, the downrigger cable may only be reeled in up to the point where the first fishing line release is connected. This prevents the downrigger cable from being completely reeled in and causes the free end portion of the downrigger cable, including the remaining fishing line releases and the downrigger ballast or trolling weight, to remain substantially inaccessible unless each fishing line release is independently removed from the downrigger cable.

The foregoing shortcomings are obviated by the present locking and releasing mechanism for a line release which includes an arrangement for releasably securing fishing line releases to a downrigger cable at locations spaced from one another. The present mechanism provides enhanced versatility for stacking a plurality of line releases, while conveniently allowing the downrigger cable to be reeled in as desired.

SUMMARY OF THE INVENTION

In accordance with the present invention, a locking and releasing mechanism for a fishing line release is provided. This mechanism has an improved arrangement for attachment to a downrigger cable. The improved mechanism is particularly well suited for stacking a plurality of fishing line releases on a downrigger cable at a predetermined spacing from one another. The present mechanism releases the attached line releases from their respective specific locations upon reeling in the downrigger cable while retaining them on the cable for subsequent repositioning. This permits convenient use of a downrigger system utilizing a plurality of stacked fishing line releases, while effectively eliminating the need to manually manipulate or remove each line release attached to the cable when the downrigger cable is reeled into the boat.

In particular, the locking and releasing mechanism for a fishing line release adapted for use with a downrigger cable and embodying the present invention includes a hollow, elongated housing, locking means rotatably mounted in the housing, a hollow spindle that extends from the housing and is adapted to receive a fishing line release, and mounting means on the spindle. The housing defines a longitudinal bore for receiving the downrigger cable therethrough. The locking means, usually in the form of a shaft, is journaled in the housing substantially transversely to the longitudinal bore and is provided with an eccentric portion that is rotatably positionable in the bore to vary the effective diameter thereof and to releasably wedge the cable against a wall portion defining the bore. The hollow spindle defines a central passageway also for receiving the downrigger cable; this passageway is substantially aligned with the longitudinal bore of the housing. The hollow spindle is further provided with mounting means for pivotally mounting a fishing line release thereon.

BRIEF DESCRIPTION OF THE DRAWINGS

In the accompanying drawings, in which like numerals are employed to designate like parts throughout the same:

FIG. 1 is a schematic view of a boat, a downrigger line and weight, and fishing poles, fishing lines and lures, showing a plurality of fishing line releases having the present locking and releasing mechanism stacked and attached to the downrigger line, each release holding one fishing line;

FIG. 2 is a side elevational view of a locking and releasing mechanism embodying the present invention;

FIG. 3 is a cross-sectional view taken along plane 3—3 of FIG. 2 partially broken away to show construction of the present locking and releasing mechanism;

FIG. 4 is a cross-sectional view taken along plane 4—4 of FIG. 3 illustrating the locking and releasing mechanism of the present invention in engagement with a downrigger cable; and FIG. 5 is a view similar to that of FIG. 4 and illustrating the locking and releasing mechanism of the present invention coacting with the downrigger arm to effect release from the downrigger cable.

DETAILED DESCRIPTION OF THE ILLUSTRATED EMBODIMENT

While the present invention is susceptible to embodiment in various forms, there is shown in the drawings and will hereinafter be described a preferred embodiment with the understanding that the present disclosure is to be considered as an exemplification of the invention and is not intended to limit the invention to the specific embodiment illustrated.

With reference to the drawings, FIG. 1 illustrates downrigger system 10, mounted to boat 12, and provided with fishing line releases 13 having the locking and releasing mechanism 14 of the present invention. Mechanisms 14 are stacked on downrigger cable 16 between the surface of the water and downrigger trolling weight or ballast 18. The downrigger system 10 further includes reel 20 rotatably supported by reel mounting base 22.

So that downrigger cable 16 may be lowered into the water at a point spaced horizontally from reel 20, and thus from boat 12, downrigger system 10 includes an elongated downrigger arm 24 for guiding cable 16 into and out of the water. Downrigger arm 24, is firmly supported by the reel mounting base 22 of the downrigger system 10. Downrigger arm 24 includes an abutment such as guide stop 26 at its free end. Guide stop 26 includes pulley 28 for smoothly guiding the downrigger cable into and out of the water.

As discussed above, trolling with a downrigger system is accomplished by using the system in conjunction with fishing rods 30 and fishing lines 32. Each fishing rod 30 may be conveniently supported by a rod holder associated with the boat or provided in association with the downrigger system 10. Each fishing line 32 may be releasably connected with the downrigger cable 16 by a suitable fishing line release associated with the locking and releasing mechanism of the present invention, such line releases being well known in the art.

Commonly owned U.S. Pat. No. 3,925,920 to Walker illustrates one such release mechanism which has proven to provide the desired release action in a reliable and adjustable fashion. In particular, after a fish takes the bait or lure on the fishing line 32, the fishing line is detached from the line release 13 on downrigger cable 16, and the rod may then be removed from the rod holder to play and eventually boat the fish.

FIG. 2 shows the locking and releasing mechanism 14 of the present invention for use with fishing line release 13. Typically, the locking and releasing mechanisms and their associated fishing line releases 13 are positioned at spaced intervals on the downrigger cable as shown in FIG. 1.

The locking and releasing mechanism 14 for a fishing line release 13 adapted for use with a downrigger cable 16 includes a hollow housing 34 of a generally cylindrically shaped configuration. An upper head portion 36 of the housing 34 is of slightly larger diameter than the lower body portion 38 of the housing for reasons that will be discussed below. The housing 34 defines two bores 40 and 42. Bore 40 is adapted to receive the downrigger cable 16 and, as will be described below, bore 42 receives a locking shaft 44. The cable bore 40 extends longitudinally through the housing, preferably at its center, and the locking shaft bore 42 extends transversely to cable bore 40. Bore 42 is located within the upper, larger diameter head portion 36 of housing 34. The locking shaft bore 42 intersects partially, but not fully, the longitudinal cable bore 40 within housing 34.

The longitudinal cable bore 40 is of a diameter slightly larger than downrigger cable 16 to allow the cable to pass therethrough. That portion of longitudinal cable bore 40 situated in the lower body portion 38 is relatively larger in diameter than the portion of bore 40 situated in the upper head portion of the housing 34. This increase in diameter of bore 40 in the lower body portion 38 of housing 34 accommodates mounting of the housing to a fishing line release as will be described below. Preferably a sleeve 46 is provided in the relatively smaller diameter portion of bore 40 to minimize wear due to cable travel and also to enhance locking action between locking shaft 44 and downrigger cable 16.

Locking shaft 44 is rotatably mounted within bore 42 of housing 34. The enlarged housing upper head portion 36 defining bore 42 also provides bearing surfaces for locking shaft 44. The shaft 44 is rotatably held within bore 42 by first and second retaining members 48 and 50 attached to opposite ends of shaft 44. In the illustrated embodiment, the retaining members are generally cylindrical in shape, although they may be formed from a variety of shapes and still perform their retaining function. One of the retaining members is of a diameter sufficiently large to act as a thumb wheel for manipulation of locking shaft 44.

As illustrated in FIG. 3, the first retaining member 48 has a diameter relatively larger than the diameter of the second retaining member 50 and is attached to one end of locking shaft 44 by a complementary right-hand threading arrangement 52. The larger diameter portion provides the operator with a manually grippable portion which allows the locking shaft 44 to be rotated within bore 42. The second retaining member 50, being smaller in diameter than the first, is adapted to fit about the second end of locking shaft 44 through frictional engagement. As illustrated, the second retaining member is in the form of a retaining ring or collar.

Locking shaft 44 is of a generally cylindrically-shaped configuration and is provided with an eccentric portion. As illustrated, the locking shaft 44 is a generally straight cylindrical shaft which has an eccentric portion in the form of a central cutout portion 54. However, it should be noted that the shaft may take a variety of configurations, including but not limited to a shape generally described as a bell crank having an eccentric portion defined as a kink in the cylindrical shaft spaced from the rotational axis of the shaft.

The cutout portion 54 as illustrated, is a generally rectangular cutout approximately at the center of the locking shaft 44, extending into the shaft a distance approximately one-third of the pin's diameter. The cutout portion is further defined by a chamfered engaging edge 56 which is formed by the generally perpendicular intersection of the cut out portion face and the surface of the cylindrical shaft. Chamfered engaging edge 56 is rotatable into and out of engagement with downrigger cable 16 providing the locking force with which to edge cable 16 against the wall of longitudinal cable bore 40. To prevent improper engagement of the eccentric portion of locking shaft 44, cutout portion 54 further defines a rounded non-engaging edge 57 disposed oppositely from chamfered engaging edge 56. Therefore, when locking shaft 44 is rotated such that the non-engaging edge 57 of cutout portion 54 engages cable 16, the cable is not wedged or locked against movement.

Locking shaft 44 is adapted to rotate within the second, transverse bore 42 and have its cutout portion 54 generally centered about the longitudinal cable bore 40 within the upper head portion 36 of housing 34. Disposition in this manner allows cutout portion 54 to selectively define the locking and free running positions for cable 16 within the upper head portion 36 of housing 34 as shown in FIGS. 4 and 5 respectively.

That is, when the cutout portion 54 is parallel with the longitudinal axis of the cable 40 the chamfered engaging edge 56 is not engaged with downrigger cable 16, allowing the full diameter of bore 40 within the upper head portion 36 of housing 34 to be available for passage of downrigger line 16. Alternatively, when the locking shaft 34 is rotated such that the chamfered engaging edge 56 is disposed within the longitudinal bore 40, obstructing its cylindrical cross-section, lockingly engaging and wedging downrigger cable 16 against the wall of the longitudial bore 40, the cable may no longer pass through the upper head portion 36 of housing 34.

The locking and releasing mechanism 14 further includes a hollow spindle 58 extending from housing 34 and carrying fishing line release 13. The fishing line release 13 includes a tapered, poppet shaped line-holding plug member 60 at one end. The fishing line 32 is releasably held onto the line release 13 through association with the plug member 60 and the body portion of the release. The fishing line remains attached to the release 13 until a sufficient amount of tension is applied to the fishing line 32, at which time the fishing line is released from the line release 13.

The walls of the fishing line release 13 define a bore therethrough which allows hollow spindle 58 to pass through the line release. The spindle is sufficiently smaller than the bore within the fishing line release 13 to permit the line release 13 to rotate freely about the spindle 58. A spindle-retaining ring or collar 62 mounted on one end of the spindle 58 below the line release 13 retains the line release 13 on the spindle 58. Preferably, collar 62 is forced onto the end of spindle 58 so as to be retained thereon by friction, i e., frictionally mounted thereon.

As illustrated in FIG. 2, the spindle 58 is a hollow cylindrically shaped member which preferably includes a slit 64 parallel to the longitudinal axis of the spindle. When inserted within the lower body portion 38 of housing 34, the portion of the spindle received therein is compressed due to the added resiliency supplied by the slit 64. Therefore, slit 64 provides a biasing force between hollow spindle 58 and housing 34 upon insertion of the spindle into the lower body portion 38 of the housing. This biasing force provides frictional mounting that holds the spindle within the portion of the longitudinal bore 40 within the lower body portion 38 of housing 34. Alternatively, spindle 58 can be glued into housing 34 or mounted therein in any other convenient manner.

The hollow spindle 58 defines spindle passageway 66 which becomes substantially aligned with longitudinal bore 40 upon insertion of the spindle 58 into the lower body portion 38 of housing 46. Therefore, the downrigger cable 16 may be inserted through the housing 46 via longitudinal bore 40 and further threaded into spindle passageway 66 and through the spindle 58, eventually exiting therefrom.

In use, the downrigger cable 16 is threaded longitudinally through housing 46 and is locked at the desired location by the above described action of locking shaft 44. More specifically, the cutout portion 54 is initially rotated within bore 44 such that it is disposed parallel to the longitudinal axis of the longitudinal cable bore 40 and generally aligned therewith. At this point, the chamfered engaging edge 56 is not within the longitudinal cable bore 40 and is aligned with the walls thereof, such that the downrigger cable 16 may be inserted and freely passed within the longitudinal bore 40. This allows the locking and releasing mechanism 14 and its associated fishing line release 13 to be selectively positioned on downrigger cable 16.

When a desired position is selected, locking shaft 44 is then rotated such that the cutout portion 54 becomes angularly disposed with respect to the longitudinal axis of longitudinal cable bore 40 and is moved into the region of the bore (FIG. 4). At this point, the chamfered engaging edge 56 is urged into and becomes lockingly engaged with downrigger cable 16. The locking and releasing mechanism and associated fishing line release are then locked and rigidly held onto downrigger cable 16. Alternatively, rotation of locking shaft 44 in the opposite direction (FIG. 5) allows cutout portion 54 again to become disposed parallel to the longitudinal axis of the cable bore 40, allowing downrigger cable 16 to be freely movable within the cable bore and within passage 66 of the hollow spindle 58. Further, to prevent undesired wedging of downrigger cable 16, rounded non-engaging edge 57 prevents locking of mechanism 14 on the downrigger cable when locking shaft 44 is over rotated in the opposite direction. Accordingly, selective positioning of the locking and releasing mechanism 14 and the fishing line release 13 may be attained through rotation of locking shaft 44, thereby selectively wedging downrigger cable 16 against the walls of longitudinal cable bore 40.

When cable 16 is moved through housing 34 in one direction, locking shaft 44 tends to rotate so as to decrease the size of longitudinal cable bore 40 and thus to enhance locking action. Alternatively, when the cable 16 is urged through housing 34 in the opposite direction, locking shaft 44 is rotated so as to open longitudinal cable bore 40 to its full size and thereby release the cable 16 from engagement with the fishing line relese 13.

Referring to FIGS. 1 and 5, a plurality of locking and releasing mechanisms 14 including fishing line releases 13 are shown in stacked configuration having downrigger weight 18 fixed at the free end of downrigger cable 16. As the downrigger cable is reeled in, all of the mechanisms and associated fishing line releases are drawn toward the arm of downrigger system 10 having abutment or guide stops 26 at its free end. The first locking and releasing mechanism 14 and its associated fishing line release 13, upon contacting the arm's guide stop 26, is forced toward downrigger weight 18 and as described above, releases and falls by gravity toward the weight.

As downrigger cable 16 is further reeled in, the previously released locking and releasing mechanism, pressing against the second locking and releasing mechanism fixed to the downrigger line, will coact with guide stop 26 and both devices will be forced toward weight 18 at the free end of downrigger cable 16. Coaction in this manner will release the second locking and releasing mechanism and its associated fishing line release and both devices will fall by gravity toward the downrigger weight.

It will be noted that as successive locking and releasing mechanisms and their associated fishing line releases are contacted by the guide stop 26 and fall by gravity down downrigger cable 16, a domino-type release of successively stacked locking and releasing mechanisms may take place. Domino-type release may occur if the released mechanism contacts the next fixed mechanism with enough impact to release the fixed mechanism independently of the force generated by coaction with guide stop 26.

In any case, release of all of the locking and releasing mechanisms and their associated fishing line releases will continue as downrigger cable 16 is reeled in, until all of the mechanisms have been released and substantially all of the downrigger cable is reeled onto downrigger reel 20. Thus, the present locking and releasing mechanism for a fishing line release for use with a downrigger cable permits uninterrupted reeling of a downrigger cable into the boat when a plurality of stacked locking and releasing mechanisms and associated fishing line releases are releasably affixed to the downrigger cable in a spaced relationship.

It will be apparent that the present invention and its component parts may be constructed from a variety of materials including metals and plastics, which preferably include, but are not limited to materials that are corrosion resistant.

The foregoing is intended as illustrative but not limiting. Variations and modifications may be effected without departing from the true spirit and scope of the present invention. No limitation with respect to the specific apparatus illustrated herein is intended or should be inferred. It is, of course, intended to cover by the appended claims all such modifications as fall within the scope of the claims.

What is claimed is:

1. A locking and releasing mechanism for a fishing line release adapted for use with a downrigger cable which comprises:
    a hollow, elongated housing defining a longitudinal bore for receiving the downrigger cable therethrough;
    locking means rotatably mounted in said housing substantially transversely to said longitudinal bore and having an eccentric portion that is positionable in said bore to vary the effective diameter thereof and to releasably wedge the cable against a wall portion defining the bore;
    a hollow spindle extending from said housing and defining a central passageway for receiving the downrigger cable, the central passageway being substantially aligned with said longitudinal bore; and
    mounting means on said spindle for pivotally mounting a fishing line release thereon.

2. The locking and releasing mechanism of claim 1, wherein
    said housing includes a body portion and an enlarged head portion, said head portion defining a transverse bore for receiving said locking means therethrough and partially intersecting said downrigger cable-carrying longitudinal bore extending through said body and head portions.

3. The locking and releasing mechanism of claim 2, including
    a sleeve within said head portion of said housing substantially defining the wall portion of said longitudinal bore for receiving said downrigger cable therethrough.

4. The locking and releasing mechanism of claim 2, wherein
    said locking means comprise a rotatable shaft disposed and journaled within said latitudinal bore wherein said eccentric portion of said shaft is rotatable into and out of engagement with said downrigger cable.

5. The locking and releasing mechanism of claim 4, wherein
    said eccentric portrion of said shaft comprises a cutout portion within the shaft, said cutout portion being disposed on either side of said longitudinal bore and having a chamfered engaging edge portion rotatable into and out of engagement with said downrigger cable.

6. The locking and releasing mechanism of claim 5, wherein
    said shaft defines a manually grippable portion to facilitate rotation of said shaft such that upon rotation of said shaft in a first direction said chamfered engaging edge portion substantially lockingly engages said downrigger cable and upon rotation in a second direction said chamfered engaging portion is substantially released from engagement with said downrigger cable.

7. The locking and releasing mechanism of claim 6, wherein
    said manually grippable portion comprises a thumbwheel mounted on one end of said shaft through a complementary threading arrangement such that rotation of said thumbwheel in said engaging direction moves said thumbwheel onto said shaft and rotation of said thumbwheel in said release direction moves said thumbwheel off of said shaft.

8. The locking and releasing mechanism of claim 1, wherein
    said hollow spindle includes at least one longitudinal slot substantially parallel to said central passageway to provide a releasable biasing force with respect to the walls of said longitudinal bore allowing frictional mounting of said hollow spindle within said elongated housing.

9. The locking and releasing mechanism of claim 8, wherein
    said hollow spindle is received and frictionally mounted within the body portion of said hollow elongated housing and having the central passageway substantially aligned with said longitudinal bore.

10. The locking and releasing mechanism of claim 1, wherein
    said hollow spindle extends through said fishing line release and said mounting means comprise a collar frictionally mounted about said hollow spindle retaining said fishing line release thereon.

11. A locking and releasing mechanism for use with a downrigger cable which comprises, in combination,
    a hollow, elongated housing defining a longitudinal bore for receiving the downrigger cable therethrough;
    locking means rotatably mounted in said housing substantially transversely to said longitudinal bore and having an eccentric portion that is positionable in said bore to vary the effective diameter thereof and to releasably wedge the cable against a wall portion defining the bore;
    a hollow spindle extending from said housing and defining a central passageway for receiving the downrigger cable, the central passageway being substantially aligned with said longitudinal bore; and
    a fishing line release pivotally mounted on said hollow spindle.

12. The locking and releasing mechanism of claim 11, wherein said housing defines a body portion and an enlarged head portion, said head portion defining a transverse bore for receiving said locking means therethrough and partially intersecting said downrigger cable-carrying longitudinal bore extending through said body and head portions.

13. The locking and releasing mechanism of claim 11, wherein said locking means comprises a rotatable shaft disposed and journaled within a latitudinal bore wherein said eccentric portion of said shaft is rotatable into and out of engagement with said downrigger cable.

14. The locking and releasing mechanism of claim 13, wherein said eccentric portion of said shaft comprises a cutout portion within said shaft disposed on either side of said longitudinal bore, said cutout portion having a chamfered engaging portion substantially engagable with said downrigger cable upon rotation of said shaft in a first direction and substantially released from said downrigger cable upon rotation in a second direction.

15. The locking and releasing mechanism of claim 14, wherein said hollow spindle includes at least one longitudinal slot substantially parallel to said central passageway to provide a releasable biasing force with respect to the walls of said longitudinal bore within the body portion of said housing for frictional mounting of said hollow spindle therein.

* * * * *